United States Patent Office 3,411,318
Patented Nov. 19, 1968

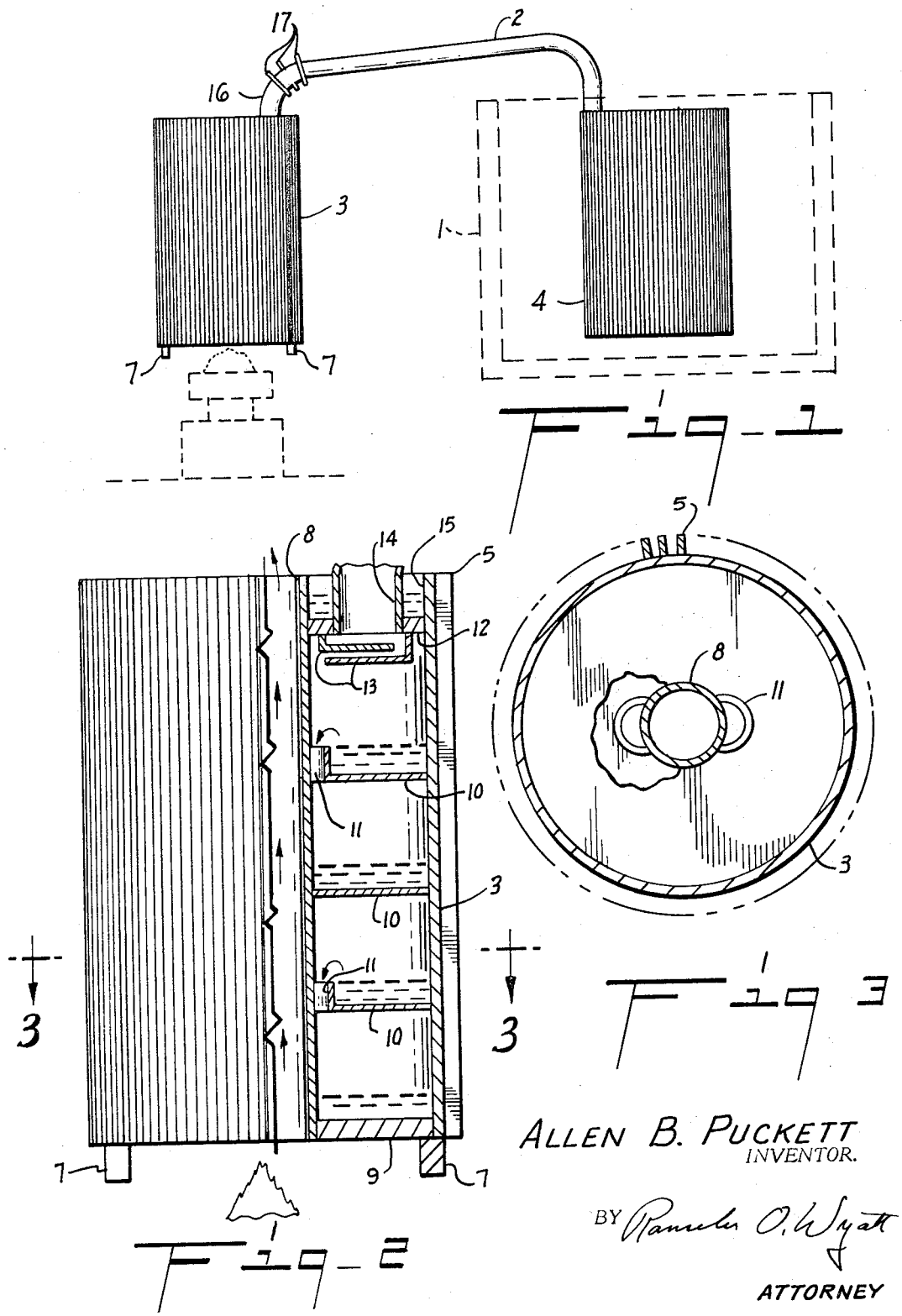

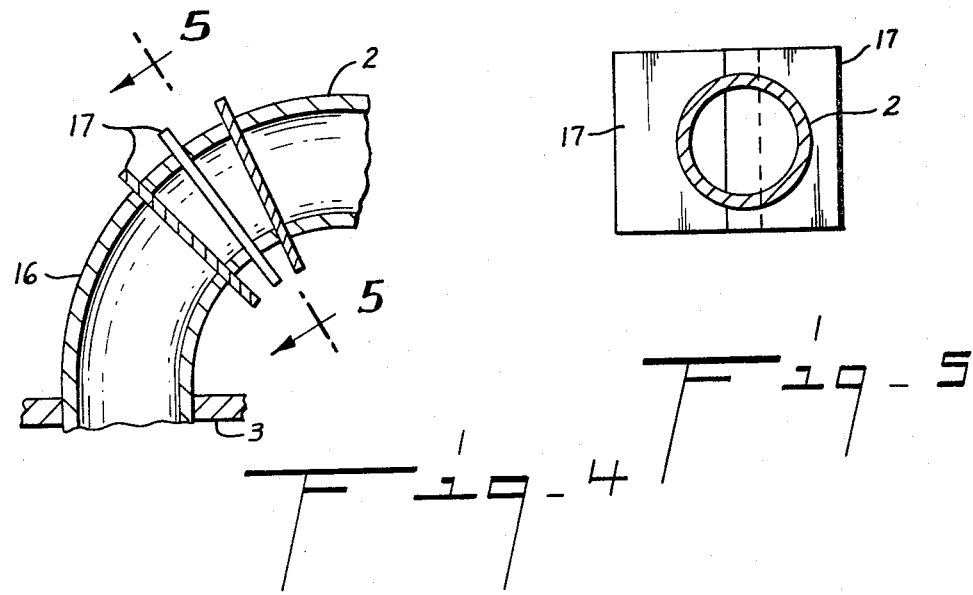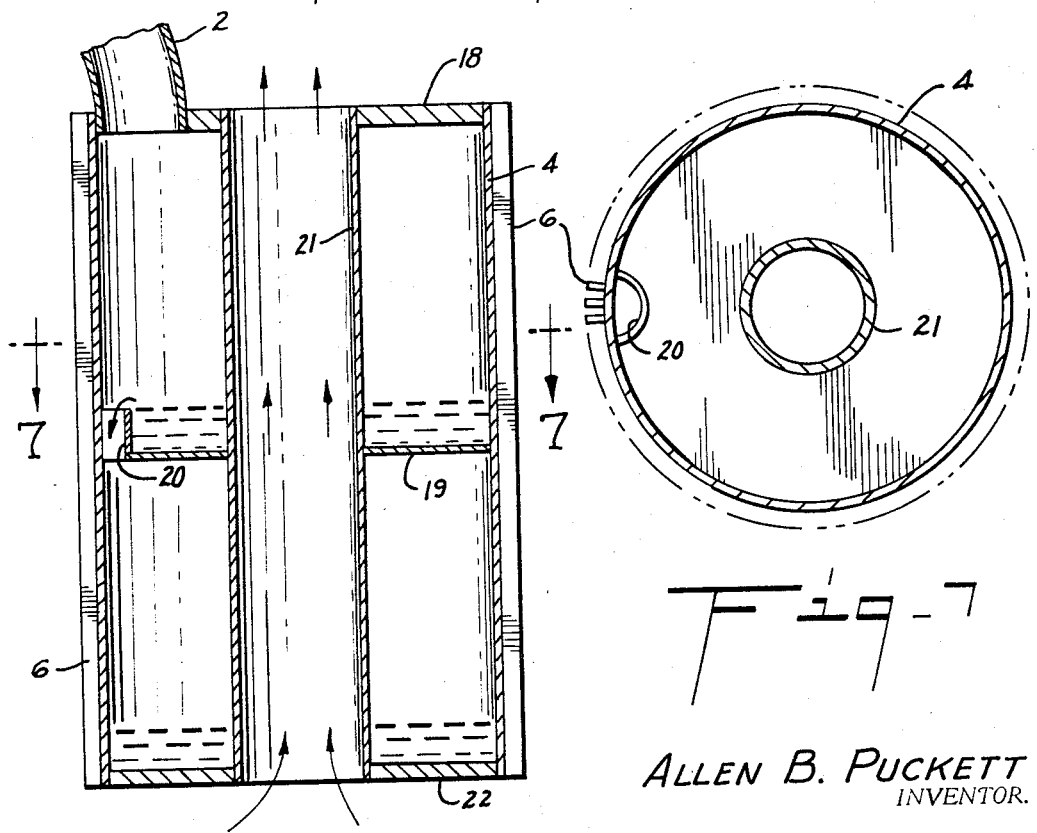

3,411,318
PORTABLE REFRIGERATING DEVICE
Allen B. Puckett, 1144 Yale,
Houston, Tex. 77008
Filed Feb. 27, 1967, Ser. No. 618,968
4 Claims. (Cl. 62—478)

ABSTRACT OF THE DISCLOSURE

A portable refrigerating apparatus for use by campers, and the like, having a sealed refrigerant and a novel means for absorbing the refrigerant agent and for heating an aqueous-ammonia solution to release the refrigerant and reactivate the evaporator apparatus, the absorber unit having trays for holding water at a constant level to absorb the ammonia gas, and the evaporator unit having trays for holding the liquid ammonia in equal proportions to assist in accomplishing the evaporation thereof.

Background of the invention

In portable refrigerators, the necessity for a power unit of some kind has impeded progress in developing a light, easily packed and carried unit. To carry the necessary amount of ice is often impossible and always cumbersome. For extended trips into areas where no power is available, there has been little offered in the way of refrigeration.

Summary of the invention

A portable refrigerating apparatus, having a novel absorbing unit that may be heated on a common camp stove and that will quickly vaporize the aqueous-ammonia solution employed, causing the ammonia to vaporize and travel in gas form into the evaporator unit where it will condense into liquid form and the evaporation process will commence, causing greatly reduced temperatures in the evaporator unit, the device being sealed and having a rigid conduit connecting the evaporator and the absorbing unit so that the evaporator may be readily and easily removed from a box to be cooled, and the absorber placed over a camp stove for heating the aqueous-ammonia solution therein to return the evaporated ammonia and recharge the evaporator unit, whereupon the evaporator is replaced in the box to be refrigerated and the camp stove removed from beneath the absorber unit.

Brief description of the drawings

FIGURE 1 is a side elevational view of the device showing the evaporator set in a box to be cooled.

FIGURE 2 is a side elevational view of the absorber unit, partially in cross section.

FIGURE 3 is an end view, in cross section, taken on the line 3—3 of FIGURE 2.

FIGURE 4 is an enlarged fragmentary side elevational view of the vapor conduit from the absorber unit to the evaporator unit, showing the moisture barriers employed.

FIGURE 5 is an end view, in cross section, taken on the line 5—5 of FIGURE 4.

FIGURE 6 is a side elevational view, in cross section, of the evaporator unit, and FIGURE 7 is an end view, in cross section, taken on the line 7—7 of FIGURE 6.

Description of the preferred embodiment

The numeral 1 designates a box to be cooled, such as a plastic or insulated box, having a removable lid (not shown) in which an opening is formed to receive the conduit 2 leading from the absorber unit 3 to the evaporator unit 4. Each unit may be provided with fins, as 5, 6 to aid in cooling each unit.

The absorber unit 3 is cylindrical in contour and has the feet 7, 7 and a tubular core 8 extends longitudinally and axially through the unit. A floor 9 is formed in the unit and spaced trays 10, 10 are mounted on the inside wall of said unit 3, each tray having an overflow conduit 11, 11, which are arranged on the respective trays so that the overflow conduits will be in staggered relation along the outside wall of the core 8.

A top 12 is formed adjacent the upper end of the unit 3 and moisture barriers 13, 13 extend across the opening 14 leading into the conduit 2. A water containing area 15 is formed on the top 12, the surface of such water being exposed to the atmosphere.

Slots are formed in the conduit 2 at the elbow 16 in which the moisture barriers and external fins 17, 17 are mounted. The inner ends of these fins overlap and the fins themselves are mounted in staggered relation, slightly inclined towards the absorber unit 3, so that moisture in the vapors from the absorber unit 3 that escape the barriers 13 will be blocked and condensed, and the water so formed will run back into the evaporator.

The conduit 2 extends from the absorber unit 3 to the top 18 of the evaporator unit 4, and the unit 4 has a single tray 19 mounted approximately midway of the respective ends thereof and an overflow conduit 20 extends through the tray 19, and is in longitudinal alignment with the openings in the lid 18 for the conduit 2. A tubular core 21 extends longitudinally and axially through the evaporator unit 4.

In use the device may be packed easily in a car trunk or the like, with the ammonia in solution with the water in the absorber unit 3. When a camp site is reached, and it is desired to activate the refrigerating apparatus, the evaporator unit 4 is elevated and turned on its side, so that any liquid therein will flow through the conduit 2 into the absorber unit 3, then the absorber unit is set on a heating element, such as a camp stove, and if fast conversion is desired, the evaporator unit may be set in a bucket of water. As the heating element heats, the core 8, acting as a smokestack, will distribute this heat throughout the unit, and the ammonia will vaporize and rise out of the water in the form of vapors, traveling upwardly through the ports 11, 11 and around the barriers 13 into the conduit 2. As the heating action continues, the water will also vaporize and the water in the chamber 15 will begin to boil. After the water in the chamber 15 commences to boil, because its upper surface is exposed to the atmosphere, and heat may escape through steam, it tends to cool the inside walls of the absorber unit adjacent the upper end thereof, causing condensation of the steam rising from the trays, and most of this water will drain back into the absorber trays, where the overflow conduits will conduct the overflow of each tray to the tray immediately beneath it, thus avoiding overloading the bottom of the container, and maintaining even water bodies for absorbing the ammonia gas. The water in the chamber 15 will be the last to reach boiling state, with reference to the trays in the absorber unit, and its boiling will indicate that the water inside of the absorber unit has also reached that point, and after approximately five minutes of boiling time of the water in the chamber 15, the user may be assured that the conversion of ammonia to gas has been completed, and the absorber unit 3 may be removed from the heat, and the evaporator unit 4 removed from the water and replaced in the cooling box, where the ammonia in the evaporator will rapidly condense and become liquid and will settle on the tray 19 and on the floor 22 of the evaporator unit 4. The evaporation process begins immediately, the vapors rising in equal quantities from each liquid surface, and the walls of the evaporator accordingly cooled. The core 21 will be similarly cooled, and being smaller in diameter, and also being a cylinder, will be subjected to the lowest temperatures so that, if desired, ice trays may be placed in the core 21 for formation of ice.

As the ammonia evaporates in the evaporator unit 4, it will build up a pressure in the top of the absorber unit and will enter the conduit 2 and will be forced into the unit 3 and there will be absorbed by the water in the absorber unit 3, such absorption relieving the pressure and causing a flow of these vapors into the absorber unit. Each tray 10 maintains a constant and equal surface area of water for fast absorption of said ammonia vapors by means of the overflow conduits 11, 11, the volume of water being constant, and the conduits 11, 11 being staggered so that the overflow from each tray will fall only into the tray beneath. With the two units being of equal size and of a capacity to hold sufficient water to absorb all of the ammonia, the formula of two and one-half pounds of water to each two pounds of ammonia is employed. If desired, salt to the amount of one cup for each two and one-half pounds of water, may be added to hasten the cooling action.

The length of time the evaporator will continue to cool the box at each cycle depends, of course, on the load to be carried. In the normal use of a well insulated camp box, this cooling period will last approximately twelve hours. When the evaporator is no longer cool to the touch, the user will know the evaporation has been completed and the absorber has absorbed the ammonia and is ready for reheating and a repetition of the cycle.

Any number of trays desired may be employed in the absorber unit, and where it is desired to provide a quick freezing, low temperature unit for ice making, or the like, the absorber unit may be divided into two compartments, as is the evaporator. In this form the vaporizing process will be greatly hastened and the evaporator temperature considerably lower.

While the foregoing is considered a preferred embodiment of the invention, it is by way of illustration only, the broad principle of the invention being defined by the appended claims.

What I claim is:

1. In a portable refrigerating unit, an absorber unit and an evaporator unit, a rigid conduit connecting said units, means for heating said absorber unit to vaporize the refrigerant and means in said absorbing unit for re-absorbing said refrigerant as it evaporates in the evaporator unit, said absorber unit having a plurality of annular trays and a longitudinal axial core, each tray having an overflow conduit adjacent said core and in staggered vertical alignment.

2. The device defined in claim 1 having a water chamber on the top of said absorber unit, having water therein exposed to the atmosphere.

3. The device defined in claim 1 having a water chamber on the top of said absorber unit having water therein exposed to the atmosphere, and having moisture barriers in said absorber unit adjacent said conduit.

4. The device defined in claim 1 wherein said evaporator unit has an upper and a lower tray and an overflow conduit at the periphery of the upper tray in longitudinal alignment with the conduit joining the absorber unit and the evaporator unit, and a tubular axial core extending longitudinally through said evaporator unit.

References Cited

UNITED STATES PATENTS

| Re. 5,287 | 2/1873 | Carre | 62—478 |
| Re. 5,288 | 2/1873 | Carre | 62—478 |
| 992,560 | 5/1911 | Heuser | 62—478 |
| 1,774,669 | 9/1930 | Reehsing | 62—478 |
| 1,915,276 | 6/1933 | Glass | 62—478 X |
| 2,929,230 | 3/1960 | Schmerzler | 62—478 |

LLOYD L. KING, *Primary Examiner.*